(12) United States Patent
Jung et al.

(10) Patent No.: US 8,805,762 B2
(45) Date of Patent: *Aug. 12, 2014

(54) AFFECTIVE MODEL DEVICE AND METHOD OF DECIDING BEHAVIOR OF THE AFFECTIVE MODEL DEVICE

(71) Applicant: Samsung Electronics Co., Ltd., Suwon-si (KR)

(72) Inventors: Hyun-Ryong Jung, Danbury, CT (US); Jamee Kim Lee, Seoul (KR); Lilia Moshkina, Alexandria, VA (US); Ronald Arkin, Marietta, GA (US); Sunghyun Park, Los Angeles, CA (US); Chien-Ming Huang, Madison, WI (US)

(73) Assignees: Samsung Electronics Co., Ltd., Suwon-si (KR); Georgia Tech Research Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/896,479

(22) Filed: May 17, 2013

(65) Prior Publication Data

US 2013/0254149 A1 Sep. 26, 2013

Related U.S. Application Data

(63) Continuation of application No. 12/960,663, filed on Dec. 6, 2010, now Pat. No. 8,458,112.

(30) Foreign Application Priority Data

Jan. 22, 2010 (KR) .................. 10-2010-0006114

(51) Int. Cl.
*G06F 17/00* (2006.01)
*G06N 5/02* (2006.01)

(52) U.S. Cl.
USPC .............................................. 706/46

(58) Field of Classification Search
USPC .............................................. 706/46
See application file for complete search history.

(56) References Cited

U.S. PATENT DOCUMENTS

| | | | |
|---|---|---|---|
| 6,249,780 B1 | 6/2001 | Mizokawa |
| 7,076,338 B2 | 7/2006 | Kuroki et al. |
| 7,103,447 B2 | 9/2006 | Di Profio et al. |
| 7,363,108 B2 | 4/2008 | Noda et al. |
| 7,379,871 B2 | 5/2008 | Shimakawa et al. |
| 7,412,390 B2 | 8/2008 | Kobayashi et al. |
| 7,689,322 B2 | 3/2010 | Tanaka |
| 7,937,337 B2 | 5/2011 | Lee et al. |
| 7,984,013 B2 | 7/2011 | Lee et al. |
| 8,204,839 B2 | 6/2012 | Lee et al. |

(Continued)

FOREIGN PATENT DOCUMENTS

| | | |
|---|---|---|
| KR | 10-2006-0026297 | 3/2006 |
| KR | 10-2008-0074758 | 8/2008 |
| KR | 10-2008-0099883 | 11/2008 |
| KR | 10-2009-0013968 | 2/2009 |

*Primary Examiner* — Michael B Holmes
(74) *Attorney, Agent, or Firm* — NSIP Law

(57) ABSTRACT

An affective model device and a method of deciding the behavior of an affective model device are provided. The affective model device has affective components representing trait, attitude, mood, emotion, and the like. The affective model device updates the emotion at regular time intervals or when a stimulus is received, and decides the behavior based on the updated emotion. The emotion may be updated depending on trait, attitude, and mood.

16 Claims, 9 Drawing Sheets

(56) References Cited

U.S. PATENT DOCUMENTS

| | | |
|---|---|---|
| 8,306,929 B2 | 11/2012 | Wu |
| 8,311,670 B2 | 11/2012 | Lee et al. |
| 8,458,112 B2 * | 6/2013 | Jung et al. ............. 706/46 |
| 8,494,982 B2 * | 7/2013 | Jung et al. ............. 706/12 |
| 2008/0195566 A1 | 8/2008 | Lee et al. |

* cited by examiner

FIG. 5

| TRAIT | TRAIT COMPONENT | TRAIT VALUE |
|---|---|---|
| | Openness | 100 |
| | Conscientiousness | 70 |
| | Extraversion | 30 |
| | Agreeableness | 0 |
| | Neuroticism | -20 |

FIG. 6

| ATTITUDE | OBJECT | ATTITUDE VALUE |
|---|---|---|
| | A | +73 |
| | B | -21 |
| | C | 0 |
| | ⋮ | ⋮ |

FIG. 7

| MOOD | TIME | MOOD VALUE |
|---|---|---|
| | am 7:00 ~ am 9:00 | -10 |
| | am 9:00 ~ am 11:00 | 0 |
| | am 11:00 ~ pm 1:00 | +10 |
| | ⋮ | ⋮ |

FIG. 8

| EMOTION | EMOTION COMPONENT | EMOTION VALUE |
|---|---|---|
| | Joy | e1 |
| | Interest | e2 |
| | Surprise | e3 |
| | Fear | e4 |
| | Anger | e5 |
| | Sadness | e6 |
| | Disgust | e7 |

AFFECTIVE MODEL DEVICE AND METHOD OF DECIDING BEHAVIOR OF THE AFFECTIVE MODEL DEVICE

CROSS-REFERENCE TO RELATED APPLICATION(S)

The present application is a continuation of U.S. patent application Ser. No. 12/960,663 filed on Dec. 6, 2010, which claims the benefit under 35 USC §119(a) of Korean Patent Application No. 10-2010-0006114, filed on Jan. 22, 2010, the entire disclosures of which are incorporated herein by reference for all purposes.

BACKGROUND

1. Field

The following description relates to components that may be applied to an affective device such as a robot, a virtual character, and the like.

2. Description of the Related Art

Recently there has been an increasing interest in robots that can imitate human behavior. Such robots may be described as "affective robots" that are developed to exhibit specific emotions in response to external stimuli and make specific expressions or motions related to the emotions. To achieve this function, generally, an affective robot has a predetermined affective model.

The affective robot may perform a specific behavior in response to a stimulus based on the state of its affective model. In other words, an affective model may be used to reflect the emotional state of the corresponding affective robot. For example, as humans have different reactions in response to the same stimulus depending on their emotional state, an affective robot may also exhibit different reactions in response to the same stimulus according to the state of its affective model.

Such an affective model may be composed of various affective components. The behaviors of an affective robot may be based on an affective model that includes a predetermined combination of affective components.

SUMMARY

In one general aspect, there is provided an affective model device, including: an emotion information storage configured to store: a first affective component that is based on input specificity and a variation interval, a second affective component including a relatively higher input specificity than the first affective component, a third affective component including a relatively smaller variation interval than the first affective component, and a fourth affective component including a relatively smaller variation interval than the second affective component and a relatively higher input specificity than the third affective component, and a behavior deciding unit configured to decide a behavior of the affective model device based on at least one of: the first affective component, the second affective component, the third affective component, and the fourth affective component.

The affective model device may further include that: the first affective component corresponds to a trait of the affective model device, the second affective component corresponds to an attitude of the affective model device, the third affective component corresponds to a mood of the affective model device, and the fourth affective component corresponds to an emotion of the affective model device.

The affective model device may further include: an affective information manager configured to update the fourth affective component using at least one of: the first affective component, the second affective component, and the third affective component, and an affective information communication unit configured to provide the updated fourth affective component to the behavior deciding unit.

The affective model device may further include that the affective information manager and the affective information communication unit include independent processing modules, independent processes, or independent threads.

The affective model device may further include that the affective information communication unit is further configured to: transfer the updated fourth affective component to the behavior deciding unit, and receive user feedback in response to a behavior decided on by the behavior deciding unit.

The affective model device may further include that the affective information manager is further configured to update at least one of: the first affective component, the second affective component, the third affective component, and the fourth affective component, based on the received user feedback.

The affective model device may further include a stimulus interpreter configured to convert a received stimulus or a received input into a predetermined format in order for the affective information manager to process the received stimulus or the received input.

The affective model device may further include that, in response to receiving two or more kinds of stimuli or inputs, the stimulus interpreter is further configured to use: a weighted average strategy involving adding different weights to the respective stimuli, or a winner-takes-all (WTA) strategy involving selecting only one of the two or more kinds of stimuli or inputs.

In another general aspect, there is provided a method for deciding the behavior of an affective model device, the method including: storing a first affective component that is based on input specificity and a variation interval, storing a second affective component including a relatively higher input specificity than the first affective component, storing a third affective component including a relatively smaller variation interval than the first affective component, storing a fourth affective component including a relatively smaller variation interval than the second affective component and a relatively higher input specificity than the third affective component, and deciding a behavior of the affective model device based on at least one of: the first affective component, the second affective component, the third affective component, and the fourth affective component.

The method may further include that: the first affective component corresponds to a trait of the affective model device, the second affective component corresponds to an attitude of the affective model device, the third affective component corresponds to a mood of the affective model device, and the fourth affective component corresponds to an emotion of the affective model device.

The method may further include updating the fourth affective component using at least one of: the first affective component, the second affective component, and the third affective component.

The method may further include that the deciding of the behavior includes deciding the behavior based on the updated fourth affective component.

The method may further include converting a received stimulus or a received input into a predetermined format according to a predetermined strategy.

The method may further include that in response to two or more kinds of stimuli or inputs being received, the strategy includes: a weighted average strategy of adding different weights to the respective stimuli or inputs, or a winner-takes-all (WTA) strategy of selecting only one of the two or more kinds of stimuli or inputs.

The method may further include: receiving user feedback in response to a behavior of the affective model device, and updating at least one of: the first affective component, the second affective component, the third affective component, and the fourth affective component, based on the received user feedback.

In another general aspect, there is provided a computer-readable storage medium storing a method for deciding the behavior of an affective model device, including: storing a first affective component that is based on input specificity and a variation interval, storing a second affective component including a relatively higher input specificity than the first affective component, storing a third affective component including a relatively smaller variation interval than the first affective component, storing a fourth affective component including a relatively smaller variation interval than the second affective component and a relatively higher input specificity than the third affective component, and deciding a behavior of the affective model device based on at least one of: the first affective component, the second affective component, the third affective component, and the fourth affective component.

Other features and aspects may be apparent from the following description, the drawings, and the claims.

BRIEF DESCRIPTION OF THE DRAWINGS

FIG. 5 is a diagram illustrating an example of trait parameters.

FIG. 6 is a diagram illustrating an example of attitude parameters.

FIG. 7 is a diagram illustrating an example of mood parameters.

FIG. 8 is a diagram illustrating an example of emotion parameters.

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
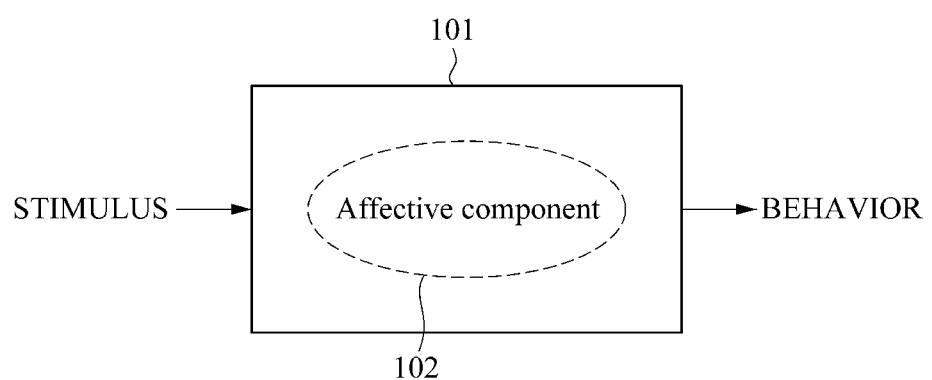
FIG. 1 is a diagram illustrating an example of an affective model system.

FIG. 1 illustrates an example of an affective model system.

Referring to FIG. 1, affective model system 101 receives various stimuli and performs a behavior or motion in response to the various stimuli. The affective model system 101 may be an affective model device having predetermined affective components 102, or a user device, for example a robot, or terminal such as a mobile phone, a PDA, and the like, in which the affective model device may be installed. In the current example, the affective model system 101 refers to both an affective model device and a user device in which the affective model device is installed.

Various kinds of stimuli may be input to the affective model system 101. For example, if the affective model system 101 is a robot, the robot may receive various sensed data as its inputs. The sensed data may include, for example, image data acquired by means of a camera, acceleration data acquired by an accelerometer, sound data acquired by a microphone, time and location data acquired by a GPS system, and the like.

The behavior or motion of the affective model system 101 that is to be performed based on the received stimulus depends on the affective components 102 stored in the affective model system 101. The affective components 102 may include personality traits, attitudes, moods, emotions, and the like. For example, when playing a trick on a person, the person's reaction may be different between based on whether the person is angry or if the person is in good spirits. Accordingly, the affective model system 101 may also exhibit different behavior patterns in response to the same stimulus depending on its affective components 102.

Figure 2:
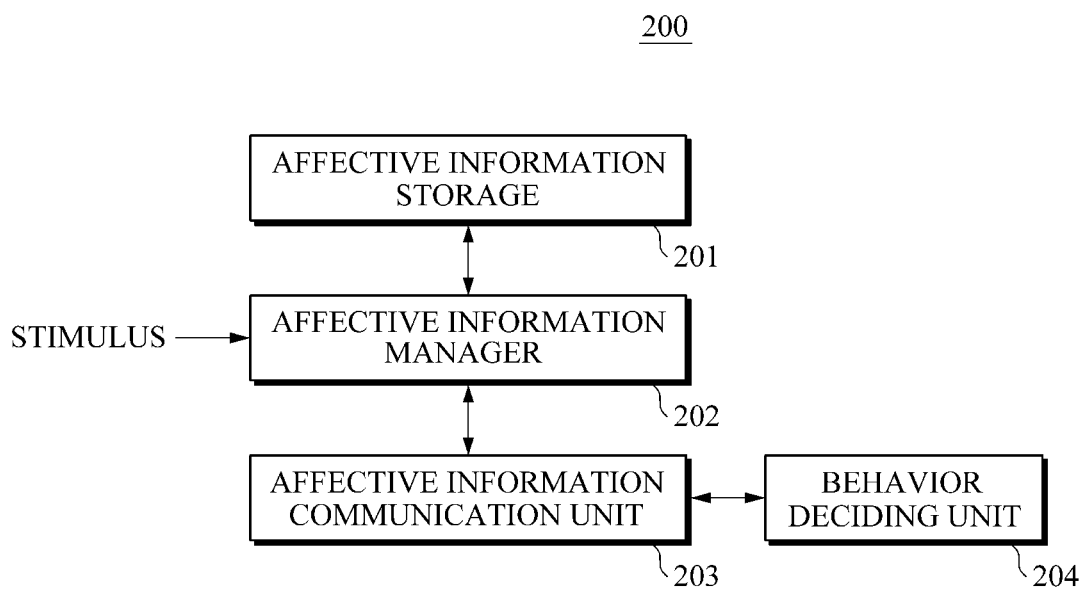
FIG. 2 is a diagram illustrating an example of an affective model device.

FIG. 2 illustrates an example of an affective model device.

Referring to FIG. 2, affective model device 200 includes an affective information storage 201, an affective information manager 202, an affective information communication unit 203, and a behavior deciding unit 204.

The affective information storage 201 may store at least one affective component. Affective components may be represented on a 2-dimensional affective plane in which one axis corresponds to input specificity against an external stimulus or input and in which the other axis corresponds to a variation interval or life-time. For example, the affective components may include a first affective component that occupies a portion on the affective plane, a second affective component that has a relatively higher input specificity than the first affective component, a third affective component that has a relatively smaller variation interval than the first affective component, and a fourth affective component that has a relatively smaller variation interval than the second affective component and relatively higher input specificity than the third affective component.

The first affective component may be represented as a trait parameter indicating a trait of the affective model device 200. Because it may be hard to change a person's personality, the first affective component or trait parameters may be maintained initially for an extended duration of time.

The second affective component may be represented as an attitude parameter indicating an attitude of the affective model device 200. The attitude parameter may be a degree of likability of the affective model device 200 with respect to certain persons or items. For example, if the affective model device 200 is installed in a robot, an attitude parameter of the robot 200 may have a positive value with respect to its owner.

The third affective component may be represented as a mood parameter indicating a mood of the affective model device 200. For example, if the affective model device 200 charges a battery of the robot 200 at a specific time, a mood parameter at that time may be illustrated as a positive value.

The fourth affective component may be represented as an emotion parameter indicating an emotion of the affective model device 200. When the affective model device 200 is installed in a robot and its owner pats the robot 200, a value of an emotion component corresponding to "Joy" may be increased.

The affective information manager 202 may update affective information stored in the affective information storage 201. The time interval at which affective information is to be updated may be arbitrarily set. For example, affective information may be updated at regular time intervals or the affective information may be updated in response to an external stimulus. Accordingly, the affective information manager 202 may update emotion parameters based on trait, attitude, and/or mood parameters stored in the affective information storage 201. For example, in response to receiving a stimulus, the affective information manager 202 may select an emotion parameter that is to be updated, and may increase or decrease an intensity of the selected emotion parameter based on trait, attitude, and/or mood parameters.

The affective information communication unit 203 may provide affective components stored in the affective information storage 201 or affective components updated by the affective information manager 202 to the behavior deciding unit 204. For example, the affective information communication unit 203 may transfer the updated emotion parameter to the behavior deciding unit 204.

Based on the received affective component, the behavior deciding unit 204 decides a behavior to be exhibited by the affective model device 200.

The affective information communication unit 203 may receive a user's feedback or user's response to a behavior decided by the behavior deciding unit 204 and transfer the feedback or response to the affective information manager 202. The affective information manager 202 may update the affective components stored in the affective information storage 201 based on the received user's feedback or response.

The affective information storage 201, the affective information manager 202, the affective information communication unit 203, and the behavior deciding unit 204 may be independent processing modules, processors, or threads. For example, any one of the affective information storage 201, the affective information manager 202, the affective information communication unit 203, and the behavior deciding unit 204 may comprise various configurations, and the remaining modules may not be influenced by the variations. Accordingly, the respective components 201, 202, 203, and 204 may be independently designed modules.

Because the affective model device 200 is configured based on affective components, such as traits, attitudes, moods, emotions and the like, the affective model device 200 may exhibit various reactions depending on situations, similar to people. In addition, because the respective elements are configured as independent modules, reusability and independency may be ensured.

Figure 3:
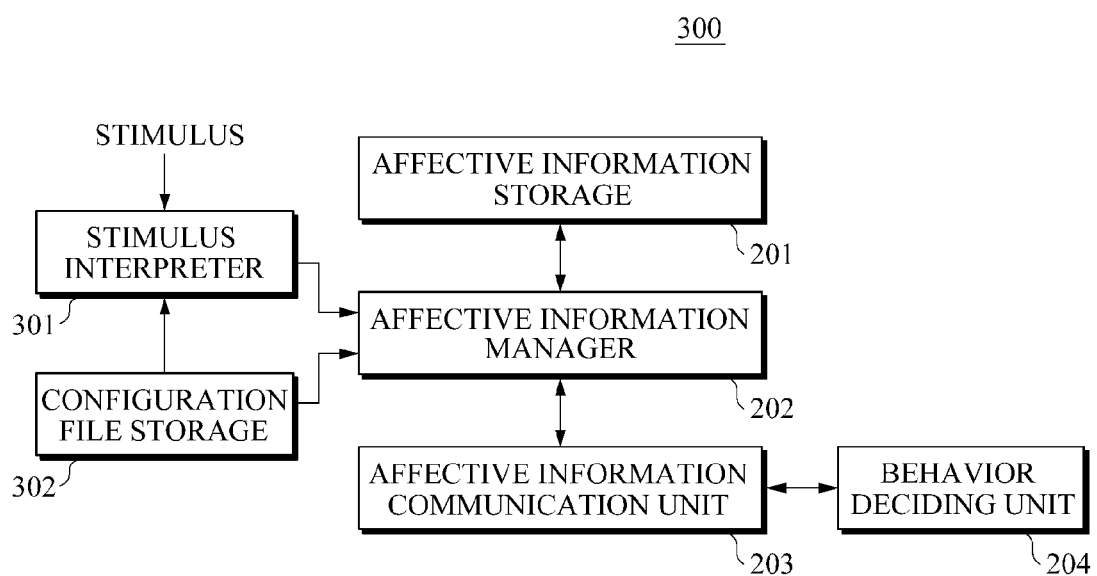
FIG. 3 is a diagram illustrating another example of an affective model device.

FIG. 3 illustrates another example of an affective model device.

Referring to FIG. 3, affective model device 300 includes an affective information storage 201, an affective information manager 202, an affective information communication unit 203, a behavior deciding unit 204, a stimulus interpreter 301, and a configuration file storage 302. In the affective model device 300, the affective information storage 201, the affective information manager 202, the affective information communication unit 203, and the behavior deciding unit 204 correspond to elements described with reference to FIG. 2.

The stimulus interpreter 301 may convert a received stimulus into a format that may be used by the affective information manager 202. For example, when the affective model device 300 is applied to user devices such as a robot, or a terminal such as a mobile phone, a PDA, and the like, the user devices may receive and use various kinds of inputs. As such, the affective model device 300 may be installed in various different user devices, and the stimulus interpreter 301 may preprocess a received stimulus to be converted into a predetermined format, regardless of the type of a user device in which the affective model device 300 is installed. Accordingly, the affective information manager 202 may process the stimulus based on various inputs.

The configuration file storage 302 may store a strategy for preprocessing stimuli. For example, the stimulus interpreter 301 may preprocess a received stimulus according to a predetermined strategy that is stored in the configuration file storage 302. A first example of the strategy is weighted average. In response to receiving two or more kinds of stimuli, the weighted average method may add the respective stimuli using the same weight or different weights. Weight values may be assigned to stimuli and may be based on the use purpose or application type. A second example of the strategy is winner-takes-all (WTA) method. In response to receiving two or more kinds of stimuli, the winner-takes-all (WTA) method may accept only one of the received stimuli and ignore the other remaining stimuli.

The configuration file storage 302 may store default values (or basic values) of the affective parameters that are stored in the affective information storage 201. When updating affective parameters stored in the affective information storage 201 or when storing and setting initial affective parameters in the affective information storage 201, the affective information manager 202 may refer to the default values of the affective parameters stored in the configuration file storage 302.

Figure 4:
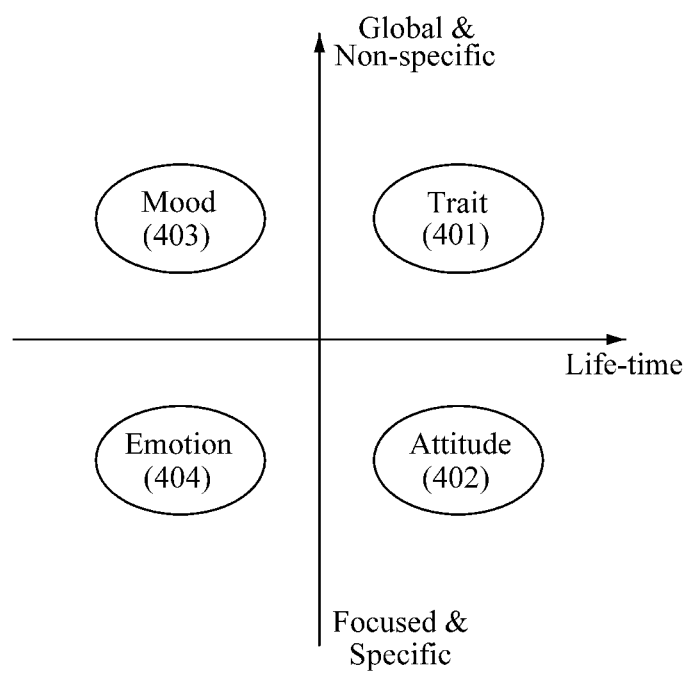
FIG. 4 is a diagram illustrating an example of the relationship between affective components.

FIG. 4 illustrates an example of the relationship between affective components.

Referring to the example shown in FIG. 4, the affective components may include a trait component 401, an attitude component 402, a mood component 403, and an emotion component 404. The affective components 401, 402, 403 and 404 may be represented on an affective plane based on input specificity and variation interval. The X-axis of the affective plane corresponds to a variation interval. For example, when certain affective components have a positive (+) value in an X-axis direction, the affective component may be determined to have a relatively long variation interval. Also, when affective components have a negative (−) value in an X-axis direction, the affective component may have a relatively short variation interval.

The Y-axis of the affective plane corresponds to input specificity. For example, as certain affective components have a negative (−) value in a Y-axis direction, the affective component is determined to react more specifically to an external stimulus or input, whereas components have a positive (+) value in a Y-axis directions may be determined to react less specifically to an external stimulus or input.

Referring to the example shown in FIG. 4, the trait component 401 may be a component that has little influence from time and little input specificity and is a basic affective component which influences different affective components. For example, the trait component 401 may be composed of trait components, such as openness, conscientiousness, extraversion, agreeableness, neuroticism, and the like.

The emotion component 404 may be an affective component exhibiting immediate variations in response to inputs while having specificity against predetermined inputs. For example, the emotion component 404 may be composed of emotional components, such as joy, interest, surprise, fear, anger, sadness, disgust, and the like. The emotion component 404 may be influenced by the trait component 401, attitude component 402, and mood component 403.

In one example, the mood component 403 is an affective component which is less sensitive to time in comparison to the emotion component 404 while having little specificity. The mood component 403 may vary depending on time or place.

The attitude component 402 is an affective component having little variations with respect to time while showing specificity to humans or items.

FIG. 5 illustrates an example of trait parameters. Each trait parameter may correspond to a first affective component.

Referring to FIG. 5, the trait parameters may be composed of a plurality of trait components and trait values corresponding to the trait components.

For example, the trait components may include values for openness, conscientiousness, extraversion, agreeableness, and neuroticism. The trait values may indicate mean intensities for the respective trait components. For example, as illustrated in FIG. 5, an affective model system (e.g., the affective model system 101 of FIG. 1) that has an openness of 100 may exhibit relatively more inquisitive, imaginative behaviors than an affective model system having an openness of 50.

Figure 6:
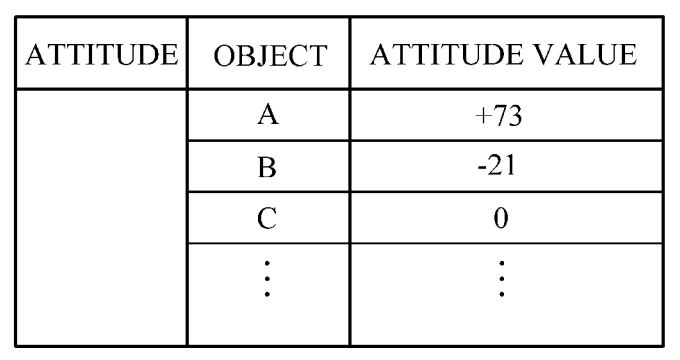

FIG. 6 illustrates an example of attitude parameters. Each attitude parameter may correspond to a second affective component.

Referring to FIG. 6, the attitude parameters may be composed of predetermined objects and attitude values about the objects.

For example, the predetermined objects may be persons or items that react with the affective model system. The attitude values may be mean degrees of likability about the corresponding objects. The attitude values may be positive or negative values depending on positive or negative likability. For example, when the affective model system is a robot, the robot 101 may have a mean attitude value of +73 for its owner A and a mean attitude value of 0 for a stranger C.

FIG. 7 illustrates an example of mood parameters. Each mood parameter may correspond to a third affective component.

Referring to FIG. 7, the mood parameters may be composed of time values and mood values. For example, mood parameters may be composed of positive mood values indicating a good mood and negative mood values indicating a bad mood for various time intervals. For example, the mood parameters may vary over time like the human biorhythm. In the current example, the criteria for varying mood values is time, however, this is merely for purposes of example. For example, the mood values may vary depending on place, time of year, weather, and the like.

FIG. 8 illustrates an example of emotion parameters. Each emotion parameter may correspond to a fourth affective component.

Referring to FIG. 8, the emotion parameter may be composed of a plurality of emotion components and emotion values for the emotion components.

For example, the emotion components may include joy, interest, surprise, fear, anger, sadness, disgust, and the like.

The emotion values may indicate mean intensities of the individual emotion components.

The emotion value for a certain emotion component may be updated at regular time intervals or in response to a certain stimulus being received. The update degree of the emotion value, that is, the increase/decrease degree of the emotion value may depend on various affective parameters as described with reference to FIGS. 5 to 7, such as, the trait, attitude and mood parameters. For example, in response to a stimulus being applied, a mood parameter may vary depending on when the stimulus is applied and an update degree of an emotion parameter may vary depending on the mood parameter.

Figure 9:
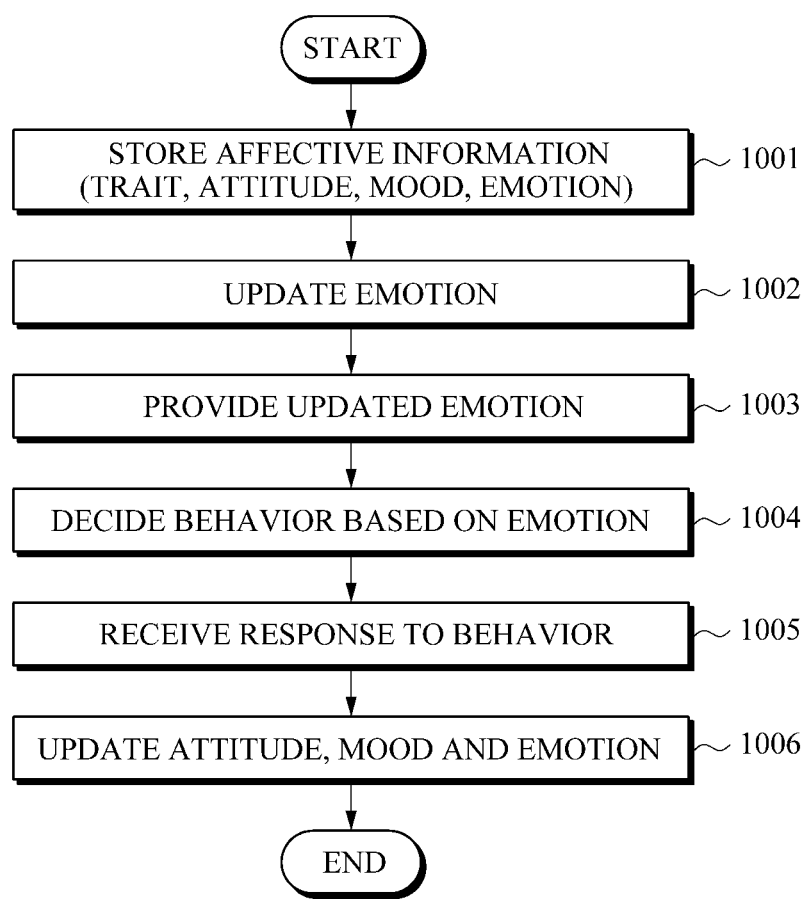
FIG. 9 is a flowchart illustrating an example of a method for deciding the behavior of an affective model device.

FIG. 9 is a flowchart illustrating an example of a method for deciding the behavior of an affective model device.

Referring to FIG. 9, the affective information may be stored in operation 1001. The affective information may be trait, attitude, mood and emotion parameters described above with reference to FIGS. 4 to 8. For example, referring again to FIGS. 2 and 3, the affective information manager 202 may load default values for the respective affective parameters from the configuration file storage 302 and store the default values in the affective information storage 201.

In operation 1002, the emotion may be updated. For example, the emotion information manager 202 may update emotion parameters among affective parameters stored in the emotion information storage 201. Updating emotion parameters may be done at regular time intervals or in response to an external stimulus being received.

The updated emotion may be provided in operation 1003. For example, the affective information communication unit 203 may transfer the updated emotion parameter to the behavior deciding unit 204.

In operation 1004, a behavior may be decided based on the provided emotion. For example, the behavior deciding unit 204 may decide a behavior to be exhibited by the affective model system 101 based on the received emotion parameter.

A response to the behavior may be received in operation 1005. For example, the behavior deciding unit 204 may receive user feedback in response to the behavior and transfer the received user feedback to the affective information communication unit 203.

In operation 1006, the affective information may be again updated. For example, the affective information manager 202 may receive user feedback from the affective information communication unit 203 and update any one of attitude, mood and emotion parameters.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An affective model device, comprising:
an emotion information storage configured to store at least two of:
 a first affective component that is based on input specificity and a variation interval;
 a second affective component comprising a relatively higher input specificity than the first affective component;
 a third affective component comprising a relatively smaller variation interval than the first affective component; and
 a fourth affective component comprising a relatively smaller variation interval than the second affective component and a relatively higher input specificity than the third affective component; and
a behavior deciding unit configured to decide a behavior of the affective model device based on at least one of: the first affective component, the second affective component, the third affective component, and the fourth affective component.

2. The affective model device of claim 1, wherein:
the first affective component corresponds to a trait of the affective model device;
the second affective component corresponds to an attitude of the affective model device;
the third affective component corresponds to a mood of the affective model device; and
the fourth affective component corresponds to an emotion of the affective model device.

3. The affective model device of claim 1, further comprising:
an affective information manager configured to update the fourth affective component using at least one of: the first affective component, the second affective component, and the third affective component; and
an affective information communication unit configured to provide the updated fourth affective component to the behavior deciding unit.

4. The affective model device of claim 3, wherein the affective information manager and the affective information communication unit comprise independent processing modules, independent processes, or independent threads.

5. The affective model device of claim 3, wherein the affective information communication unit is further configured to:
transfer the updated fourth affective component to the behavior deciding unit; and
receive user feedback in response to a behavior decided on by the behavior deciding unit.

6. The affective model device of claim 5, wherein the affective information manager is further configured to update at least one of: the first affective component, the second affective component, the third affective component, and the fourth affective component, based on the received user feedback.

7. The affective model device of claim 3, further comprising a stimulus interpreter configured to convert a received stimulus or a received input into a predetermined format in order for the affective information manager to process the received stimulus or the received input.

8. The affective model device of claim 7, wherein, in response to receiving two or more kinds of stimuli or inputs, the stimulus interpreter is further configured to use:
a weighted average strategy involving adding different weights to the respective stimuli; or
a winner-takes-all (WTA) strategy involving selecting only one of the two or more kinds of stimuli or inputs.

9. A method for deciding the behavior of an affective model device, the method comprising:
storing at least two of:
 a first affective component that is based on input specificity and a variation interval,
 a second affective component comprising a relatively higher input specificity than the first affective component,
 a third affective component comprising a relatively smaller variation interval than the first affective component, and
 a fourth affective component comprising a relatively smaller variation interval than the second affective component and a relatively higher input specificity than the third affective component; and
deciding a behavior of the affective model device based on at least one of: the first affective component, the second affective component, the third affective component, and the fourth affective component.

10. The method of claim 9, wherein:
the first affective component corresponds to a trait of the affective model device;

the second affective component corresponds to an attitude of the affective model device;

the third affective component corresponds to a mood of the affective model device; and the fourth affective component corresponds to an emotion of the affective model device.

11. The method of claim 9, further comprising updating the fourth affective component using at least one of: the first affective component, the second affective component, and the third affective component.

12. The method of claim 11, wherein the deciding of the behavior comprises deciding the behavior based on the updated fourth affective component.

13. The method of claim 9, further comprising converting a received stimulus or a received input into a predetermined format according to a predetermined strategy.

14. The method of claim 13, wherein, response to two or more kinds of stimuli or inputs being received, the strategy comprises:

a weighted average strategy of adding different weights to the respective stimuli or inputs; or a winner-takes-all (WTA) strategy of selecting only one of the two or more kinds of stimuli or inputs.

15. The method of claim 9, further comprising:

receiving user feedback in response to a behavior of the affective model device; and updating at least one of: the first affective component, the second affective component, the third affective component, and the fourth affective component, based on the received user feedback.

16. A computer-readable storage medium storing a program for executing a method for deciding the behavior of an affective model device, the method comprising:

storing at least two of:

a first affective component that is based on input specificity and a variation interval, a second affective component comprising a relatively higher input specificity than the first affective component, a third affective component comprising a relatively smaller variation interval than the first affective component, and a fourth affective component comprising a relatively smaller variation interval than the second affective component and a relatively higher input specificity than the third affective component; and deciding a behavior of the affective model device based on at least one of: the first affective component, the second affective component, the third affective component, and the fourth affective component.

* * * * *